United States Patent
Abou Mahmoud et al.

(10) Patent No.: US 10,129,199 B2
(45) Date of Patent: *Nov. 13, 2018

(54) ENSURING THAT A COMPOSED MESSAGE IS BEING SENT TO THE APPROPRIATE RECIPIENT

(71) Applicant: International Business Machines Corporation, Armonk, NY (US)

(72) Inventors: Alaa Abou Mahmoud, Dracut, MA (US); Gregory P. Dracoulis, Boston, MA (US); Peter E. Stubbs, Georgetown, MA (US); Steven J. Ulrick, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,321

(22) Filed: Oct. 5, 2017

(65) Prior Publication Data

US 2018/0048613 A1 Feb. 15, 2018

Related U.S. Application Data

(63) Continuation of application No. 14/734,594, filed on Jun. 9, 2015, now Pat. No. 9,866,511.

(51) Int. Cl.
*G06F 15/16* (2006.01)
*H04L 12/58* (2006.01)
*H04L 29/08* (2006.01)

(52) U.S. Cl.
CPC .............. *H04L 51/30* (2013.01); *H04L 51/32* (2013.01); *H04L 51/34* (2013.01); *H04L 67/306* (2013.01); *H05K 999/99* (2013.01)

(58) Field of Classification Search
CPC .. G06Q 10/107; G06Q 50/01; H04L 12/1822; H04L 51/16; H04L 51/22; H04L 51/28; H04L 51/32
(Continued)

(56) References Cited

U.S. PATENT DOCUMENTS 7,292,723 B2  11/2007  Tedesco et al.
7,620,387 B2  11/2009  Rybak
(Continued)

FOREIGN PATENT DOCUMENTS

WO     2013116848 A2    8/2013

OTHER PUBLICATIONS

Office Action for U.S. Appl. No. 15/599,268 dated Nov. 3, 2017, pp. 1-42.
(Continued)

*Primary Examiner* — Dustin Nguyen
*Assistant Examiner* — Hao Nguyen
(74) *Attorney, Agent, or Firm* — Robert A. Voigt, Jr.; Winstead, P.C.

(57) ABSTRACT

A method, system and computer program product for ensuring that the composed message is being sent to the appropriate recipient. A message being composed by an author is detected. The intended recipient(s) to receive the composed message are identified. The composed message is then analyzed to identify one or more of the following characteristics: a topic, a greeting, a dialect, a conversation pattern and a language pattern. A profile for the intended recipient storing information regarding the characteristics of the recipient (e.g., social group, historical topics discussed, conversation pattern) is obtained. A score is generated based on the consistency between the characteristics of the analyzed message with the characteristics of the recipient obtained from the recipient's profile. A notification may then
(Continued)

be issued to the author if the score is less than a threshold value to ensure that the intended recipient is the correct recipient to receive the composed message.

17 Claims, 7 Drawing Sheets

(58) Field of Classification Search
USPC ........ 709/204, 205, 206, 226, 245; 707/736; 715/752
See application file for complete search history.

(56) References Cited

U.S. PATENT DOCUMENTS

| | | | |
|---|---|---|---|
| 8,135,787 B2 | 3/2012 | Bansal et al. | |
| 8,542,606 B2 | 9/2013 | Yach et al. | |
| 8,675,845 B2 | 3/2014 | Rybak | |
| 8,892,672 B1 | 11/2014 | Rackliffe | |
| 8,903,926 B2 | 12/2014 | Bastide et al. | |
| 8,949,353 B1 | 2/2015 | Beguin | |
| 9,667,577 B2 | 5/2017 | DeLuca et al. | |
| 2003/0105815 A1 | 6/2003 | Gusler et al. | |
| 2004/0001090 A1* | 1/2004 | Brown et al. | 715/752 |
| 2005/0198125 A1* | 9/2005 | Macleod Beck | G06Q 10/107 709/204 |
| 2007/0294428 A1* | 12/2007 | Guy et al. | 709/245 |
| 2008/0168142 A1 | 7/2008 | Chung | |
| 2009/0157824 A1 | 6/2009 | Chu | |
| 2009/0307316 A1 | 12/2009 | Murphy et al. | |
| 2010/0223335 A1* | 9/2010 | Fu et al. | 709/205 |
| 2010/0223341 A1 | 9/2010 | Manolescu et al. | |
| 2012/0011192 A1 | 1/2012 | Meister et al. | |
| 2012/0291087 A1 | 11/2012 | Agrawal | |
| 2012/0296965 A1* | 11/2012 | Srivastava | 709/206 |
| 2013/0191474 A1 | 7/2013 | Goel et al. | |
| 2013/0282841 A1 | 10/2013 | Bates et al. | |
| 2013/0290317 A1 | 10/2013 | Spivack et al. | |
| 2013/0290426 A1 | 10/2013 | Sorensen | |
| 2013/0304827 A1 | 11/2013 | Bastide et al. | |
| 2014/0195933 A1 | 7/2014 | Rao DV | |
| 2015/0149153 A1 | 5/2015 | Werth et al. | |
| 2015/0215252 A1* | 7/2015 | Rackliffe | H04L 51/32 709/206 |
| 2015/0278195 A1 | 10/2015 | Yang et al. | |
| 2015/0358266 A1 | 12/2015 | Kaplinger et al. | |
| 2016/0148156 A1* | 5/2016 | Gaucher et al. | 707/736 |
| 2016/0205052 A1 | 7/2016 | DeLuca et al. | |
| 2017/0177928 A1 | 6/2017 | Cunico et al. | |

OTHER PUBLICATIONS

Zaino, Jennifer, "Contextual Analysis Tool Could Have Helped Pinpoint U.K. Riot Locations," http://semanticweb.com/contextual-analysis-tool-could-have-helped-pinpoint-u-k-riot-locations_b22417, Aug. 18, 2011, pp. 1-3.

Edge, Abigail, "Managing Multiple Twitter Profiles: What to do if You Post to the Wrong Account," http://abigailedge.co.uk/2012/07/09/managing-multiple-twitter-profiles-what-to-do-if-you-post-to-the-wrong-account, Jul. 9, 2012, pp. 1-4.

Murayama et al., "Usability Issues in Security," Security Protocols 2012, LNCS 7622, 2012, pp. 161-171.

Anonymously, "Mobile-Side Configurable Pseudo-Email and Phone-Call Receiving Filter for Alerting Users Intelligently Based on Different Personal Preferences and Email Priority Levels," IP.com No. IPCOM000130466D, Oct. 31, 2005, pp. 1-4.

Anonymously, "Securing Sensitive Emails and Messages," IP.com No. IPCOM000226589D, Apr. 17, 2013, pp. 1-4.

"Phone.com Mobile. Connected on the go," http://www.phone.com/features/mobile_office.php, at least as early as May 2014, pp. 1-9.

Juan Carlos Perez, "Gmail Detects Potential Recipient Mistakes in Group E-mails," http://www.pcworld.com/article/173574/article.html, Oct. 13, 2009, pp. 1-8.

Jon Perlow, "New in Labs: Stop Sending Mail You Later Regret," http://gmailblog.blogspot.com/2008/10/new-in-labs-stop-sending-mail-you-later.html, Oct. 6, 2008, pp. 1-2.

Adam Dachis, "How to Undo and Avoid Sending Accidentally Embarrassing Messages," http://lifehacker.com/how-to-undo-and-avoid-sending-accidentally-embarrassing-1482737736, Dec. 17, 2013, pp. 1-6.

List of IBM Patents or Patent Applications Treated as Related, Oct. 6, 2017, pp. 1-2.

* cited by examiner

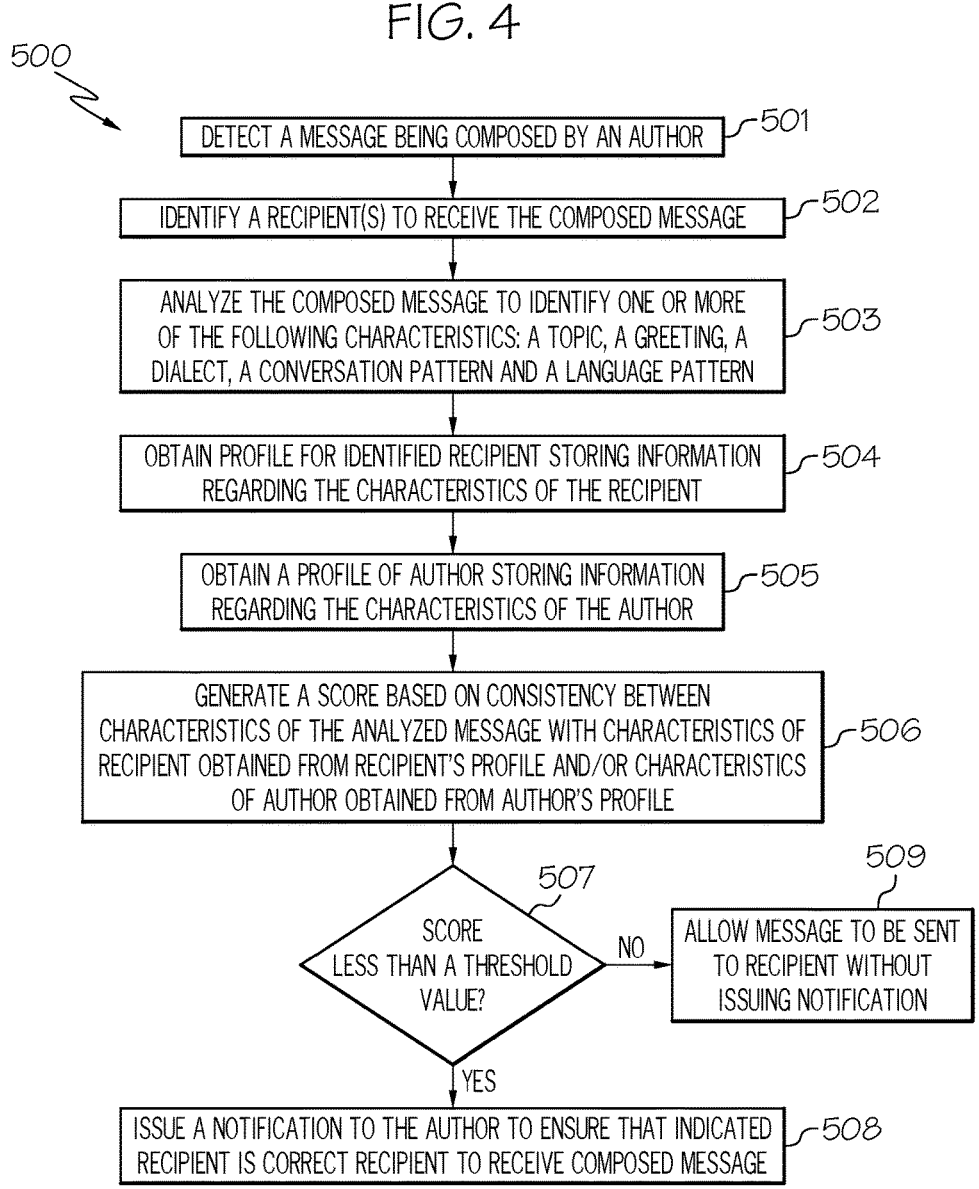

ENSURING THAT A COMPOSED MESSAGE IS BEING SENT TO THE APPROPRIATE RECIPIENT

TECHNICAL FIELD

The present invention relates generally to communications, and more particularly to ensuring that a composed message is being sent to the appropriate recipient.

BACKGROUND

Currently, it is common for a user to have multiple communication channels (e.g., e-mail, instant message, social media) open with different participants at the same time on the same computing device. For example, a user may be communicating with two different individuals in two separate instant messaging chat sessions at the same time on the user's computing device. In another example, a user may be in the process of e-mailing a work colleague while at the same posting a message on the user's social media (e.g., Facebook®) homepage.

As a result, it is not uncommon for a user to accidentally send a message to an unintended person. For example, a user may accidentally e-mail a message to the user's work colleague that the user intended to post on the user's social media homepage. If the message contained questionable content, then sending the message to the unintended person could be embarrassing, disrespectful or even result in the user losing his/her job. Hence, it is important to ensure that the message is being sent to the correct person.

Unfortunately, there is not currently a means for ensuring that composed messages are being sent to the intended recipient.

SUMMARY

In one embodiment of the present invention, a method for ensuring that a composed message is being sent to an appropriate recipient comprises detecting a message being composed by an author using a computing device. The method further comprises identifying a recipient to receive the composed message in response to detecting the message being composed by the author. The method additionally comprises analyzing the composed message to identify one or more of the following characteristics of the composed message: a topic, a greeting, a dialect, a conversation pattern and a language pattern. Furthermore, the method comprises obtaining one or more of the following characteristics of the recipient from a first profile: a name, a language, a location, a gender, an age, an ethnicity, a social group, an expertise, interests, topic affinities for particular users, a language pattern, historical topics discussed, topic discussed in current conversation thread and a conversation pattern. Additionally, the method comprises generating, by a processor, a score based on a consistency between the characteristics of the composed message with the characteristics of the recipient obtained from the first profile. In addition, the method comprises issuing a warning notification to the author to ensure that the recipient is a correct recipient to receive the composed message in response to the score being less than a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 4 is a flowchart of a method for populating profiles of users in accordance with an embodiment of the present invention;

FIG. 5 is a flowchart of a method for ensuring that a composed message is being sent to the appropriate recipient in accordance with an embodiment of the present invention;

DETAILED DESCRIPTION

The present invention comprises a method, system and computer program product for ensuring that the composed message is being sent to the appropriate recipient. In one embodiment of the present invention, a message (e.g., instant message, e-mail message, social media post) being composed by an author is detected. The intended recipient(s) to receive the composed message are identified. The composed message is then analyzed to identify one or more of the following characteristics: a topic, a greeting, a dialect, a conversation pattern and a language pattern. A profile for the intended recipient storing information regarding the characteristics of the recipient is obtained. For example, a profile may store both static information (e.g., name, language, location, gender, age, ethnicity, social group, expertise, interest) and dynamic information (e.g., topic affinities, language pattern, historical topics discussed, topic discussed in current conversation thread, conversation pattern) which are used to identify the characteristics of the recipient. A score is generated based on the consistency between the characteristics of the analyzed message with the characteristics of the recipient obtained from the recipient's profile. A notification may then be issued to the author if the score is less than a threshold value to ensure that the intended recipient is the correct recipient to receive the composed message. In this manner, such a notification may prevent the author from sending a message to an unintended person thereby preventing a potentially embarrassing situation.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
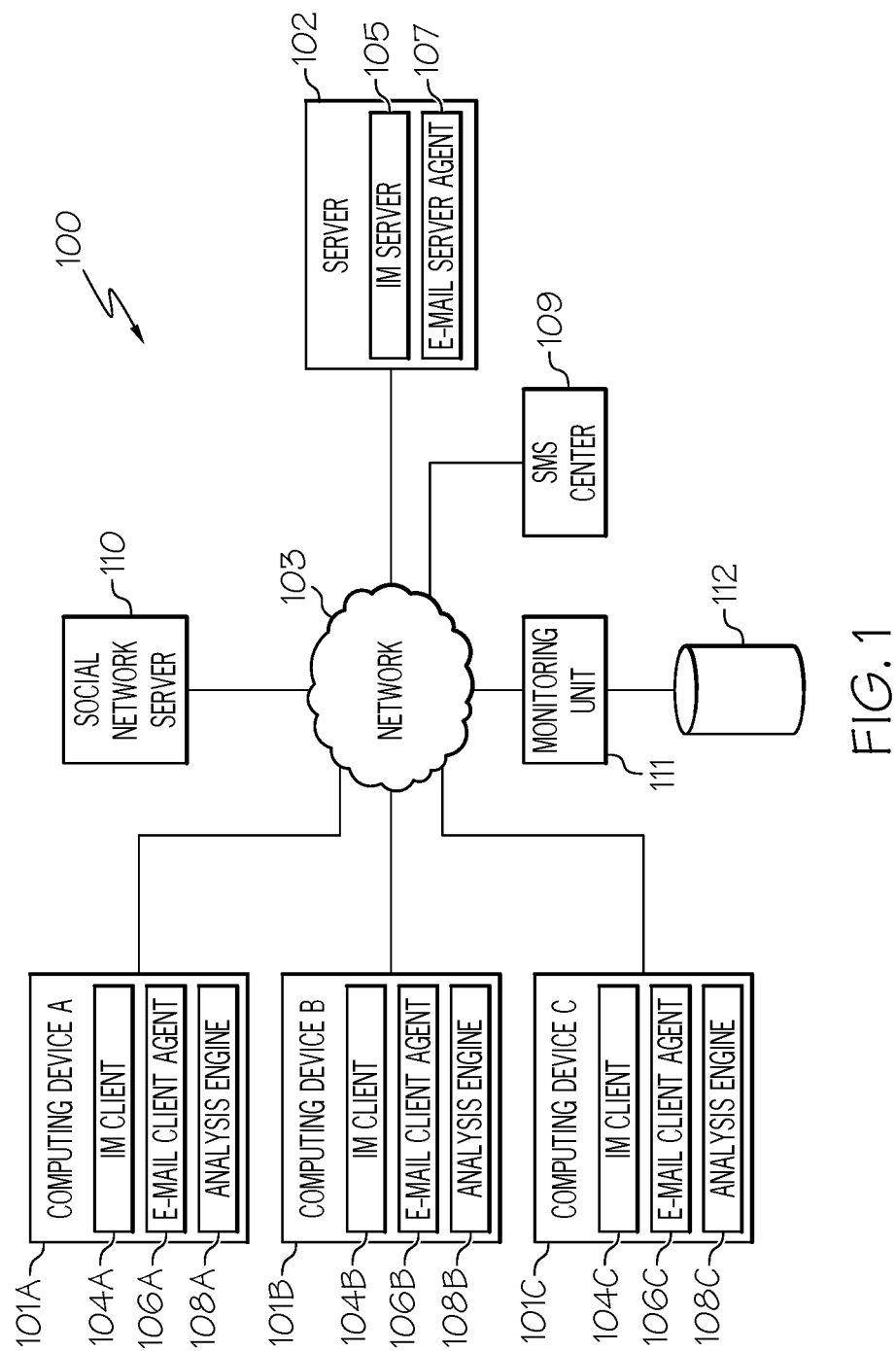
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102.

Computing devices 101 may be configured to send and receive text-based messages in real-time during an instant messaging session. Any user of computing devices 101 may be the creator or initiator of an instant message (message in instant messaging) and any user of computing devices 101 may be a recipient of an instant message. Furthermore, any user of computing devices 101 may be able to create, receive and send e-mails. Additionally, any user of computing devices 101 may be able to send and receive text messages, such as Short Message Services (SMS) messages. The term "messages," as used herein, encompasses each of these types of messages as well as posts to social media websites, such as Facebook®, forums, wikis, etc.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing device 101A-101C may further include a software agent, referred to herein as an e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of computing device 101 to create, send and receive e-mails. E-mail server agent 107 is configured to receive e-mail messages from computing device 101 and distribute the received e-mail messages among the one or more computing devices 101.

Furthermore, computing devices 101A-101C may include a software agent, referred to herein as the "analysis engine" 108A-108C, respectively, configured to ensure that a composed message is being sent to the appropriate recipient, where a "composed message," as used herein, refers to any of the messages discussed above (e.g., e-mail message, instant message, text message) as well as posts to social media websites, such as Facebook®, forums, wikis, etc. A description of the hardware configuration of computing device 101 is provided below in connection with FIG. 2.

While the preceding discusses each computing device 101 as including an IM client 104, an e-mail client agent 106 and an analysis engine 108, each computing device 101 may not necessarily include each of these software agents. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents.

System 100 further includes a Short Message Service (SMC) center 109 configured to relay, store and forward text messages, such as SMS messages, among computing devices 101 through network 103.

System 100 further includes a social network server 110, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 110 is connected to network 103 by wire or wirelessly. While FIG. 1 illustrates a single social network server 110, it is noted for clarity that multiple servers may be used to implement the social networking and/or microblogging service.

System 100 further includes a monitoring unit 111 connected to network 103 via wire or wirelessly. Monitoring unit 111 is configured to monitor messages sent/posted among the users of computing devices 101 and extracting characteristics of these monitored messages using natural language processing. Such characteristics may include topic affinities for the user, the language pattern of the user, the historical topic discussed by the user, the topic discussed in the current conversation thread, the conversation pattern of the user, etc.

A "topic affinity," refers to a subject that the user repeatedly discusses in the user's messages. For example, monitoring unit 111 may utilize natural language processing to identify the topic affinity for a user based on identifying the repeated use of a keyword (e.g., Detroit Tigers® baseball team) in the user's messages.

A "language pattern" refers to the pattern of language utilized by the user for certain recipients. For example, monitoring unit 111 may utilize natural language processing to identify a language pattern of the user in the user's messages. For instance, a user with a Chinese ethnicity may always use a foreign greeting (e.g., Chinese greeting) in the user's messages when greeting users with the same cultural background.

A "historical topic" discussed by the user refers to a topic (main subject) discussed in the user's previously sent messages. For example, monitoring unit 111 may utilize natural language processing to identify the historical topic discussed by the user in the user's previously sent messages. For instance, monitoring unit 111 may identify the historic topic discussed by the user by identifying keywords (e.g., "travel," "birthday party") in the previous conversation thread.

Similarly, monitoring unit 111 may utilize natural language processing to identify the topic of the current conversation thread.

A "conversation pattern" refers to the conversation tone of the message, use of abbreviations by the user in the message, the formality of the words utilized by the user in the message and the use of emotion words by the user in the message. In one embodiment, the conversation pattern is identified in the message using natural language processing. For example, the user may utilize a more informal tone in an e-mail to a personal friend than in comparison to an e-mail to the user's boss. A description of the hardware configuration of monitoring unit 111 is provided below in connection with FIG. 3.

Such characteristics may be stored in profiles which are stored in a database 112 connected to monitoring unit 111. Such profiles may include static information (e.g., name, language, location, gender, age, ethnicity, social group, expertise, interest) as well as dynamic information (e.g., topic affinities, language pattern, historical topics discussed, topic discussed in current conversation thread, conversation pattern). In one embodiment, the static information may be provided by the user. In another embodiment, monitoring unit 111 may obtain the static information about the user from social media sources. For instance, the user may indicate such information (e.g., name, language, location, gender, age, ethnicity, social group, expertise, interest, etc.) on the user's social media homepage.

System 100 is not to be limited in scope to any one particular network architecture. System 100 may include any number of computing devices 101, servers 102, networks 103, SMS centers 109, social network servers 110, monitoring units 111 and databases 112.

Figure 2:
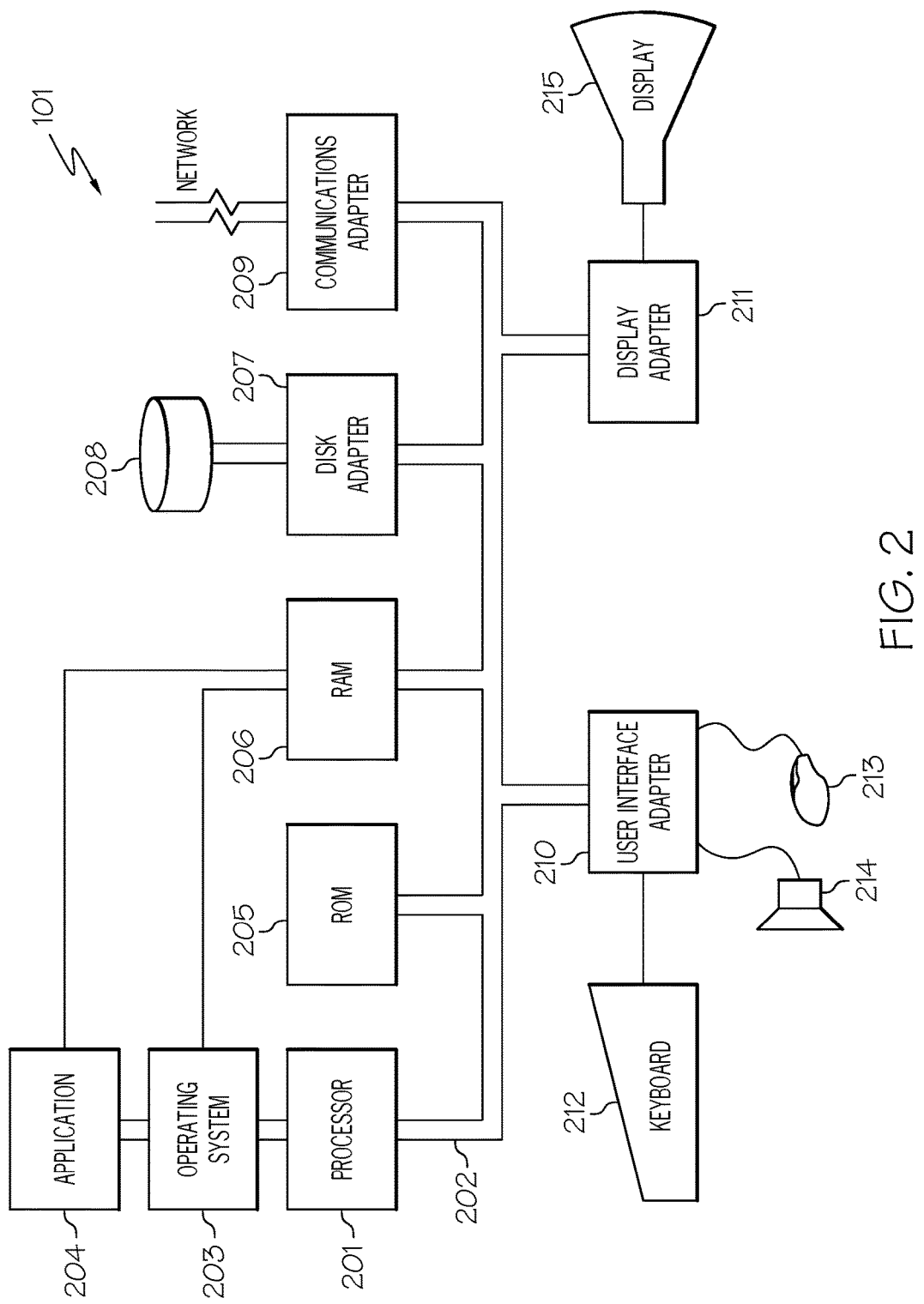
FIG. 2 illustrates a hardware configuration of a computing device in accordance with an embodiment of the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, analysis engine 108 for ensuring that a composed message is being sent to the appropriate recipient as discussed further below in connection with FIGS. 5-8.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive.

Computing device 101 may further include a communications adapter 209 coupled to bus 202. Communications adapter 209 interconnects bus 202 with an outside network thereby enabling computing device 101 to communicate with other devices (e.g., other computing devices 101, server 102, SMS center 109, social network server 110).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

Figure 3:
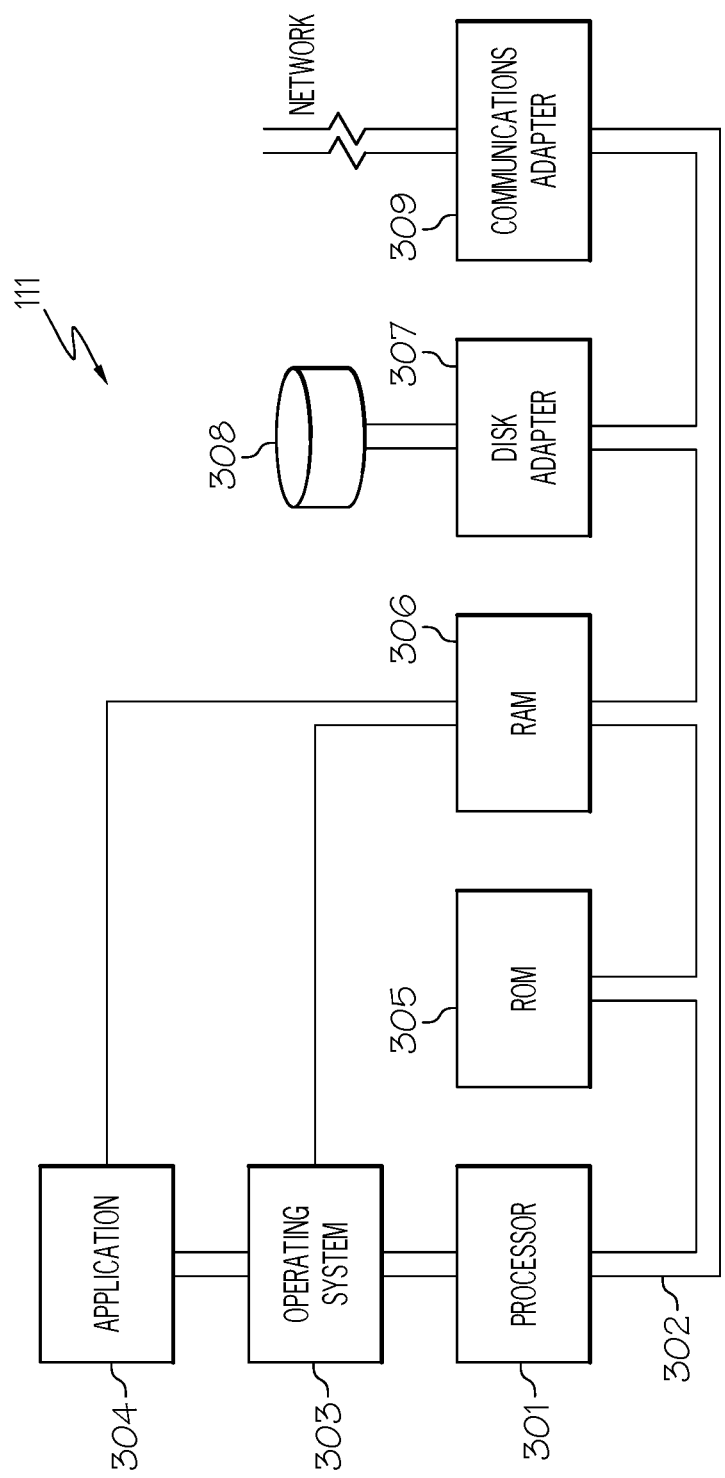
FIG. 3 illustrates a hardware configuration of a monitoring unit in accordance with an embodiment of the present invention.

Referring now to FIG. 3, FIG. 3 illustrates a hardware configuration of monitoring unit 111 (FIG. 1) which is representative of a hardware environment for practicing the present invention. Referring to FIG. 3, monitoring unit 111 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for monitoring the messages sent/posted among the users of computing devices 101 and extracting characteristics of these monitored messages as discussed further below in connection with FIG. 4.

Referring again to FIG. 3, read-only memory ("ROM") 305 is coupled to system bus 302 and includes a basic input/output system ("BIOS") that controls certain basic functions of monitoring unit 111. Random access memory ("RAM") 306 and disk adapter 307 are also coupled to system bus 302. It should be noted that software components including operating system 303 and application 304 may be loaded into RAM 306, which may be monitoring unit's 111 main memory for execution. Disk adapter 307 may be an integrated drive electronics ("IDE") adapter that communicates with a disk unit 308, e.g., disk drive. It is noted that the program for monitoring the messages sent/posted among the users of computing devices 101 and extracting characteristics of these monitored messages, as discussed further below in connection with FIG. 4, may reside in disk unit 308 or in application 304.

Monitoring unit 111 may further include a communications adapter 309 coupled to bus 302. Communications adapter 309 interconnects bus 302 with an outside network (network 103 of FIG. 1) thereby enabling monitoring unit 111 to communicate with other devices, such as computing devices 101, server 102, SMS center 109, social network sever 110, etc. of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, it is common for a user to have multiple communication channels (e.g., e-mail, instant message, social media) open with different participants at the same time on the same computing device. For example, a user may be communicating with two different individuals in two separate instant messaging chat sessions at the same time on the user's computing device. In another example, a user may be in the process of e-mailing a work colleague while at the same posting a message on the user's social media (e.g., Facebook®) homepage. As a result, it is not uncommon for a user to accidentally send a message to an unintended person. For example, a user may accidentally e-mail a message to the user's work colleague that the user intended to post on the user's social media homepage. If the message contained questionable content, then sending the message to the unintended person could be embarrassing, disrespectful or even result in the user losing his/her job. Hence, it is important to ensure that the message is being sent to the correct person. Unfortunately, there is not currently a means for ensuring that composed messages are being sent to the intended recipient.

Figure 6:
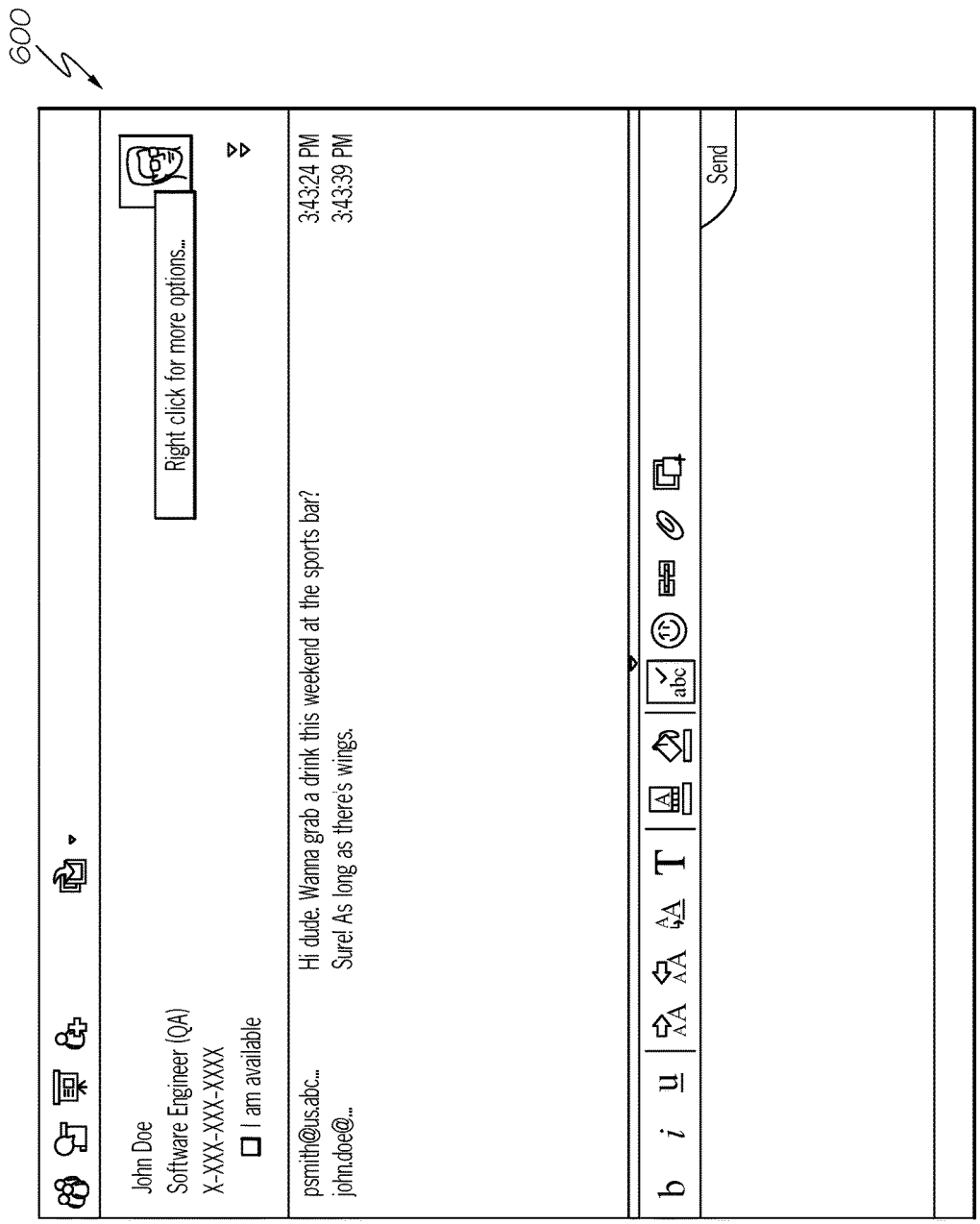
FIG. 6 illustrates a first instant message chat session with John Doe in accordance with an embodiment of the present invention.
Figure 7:
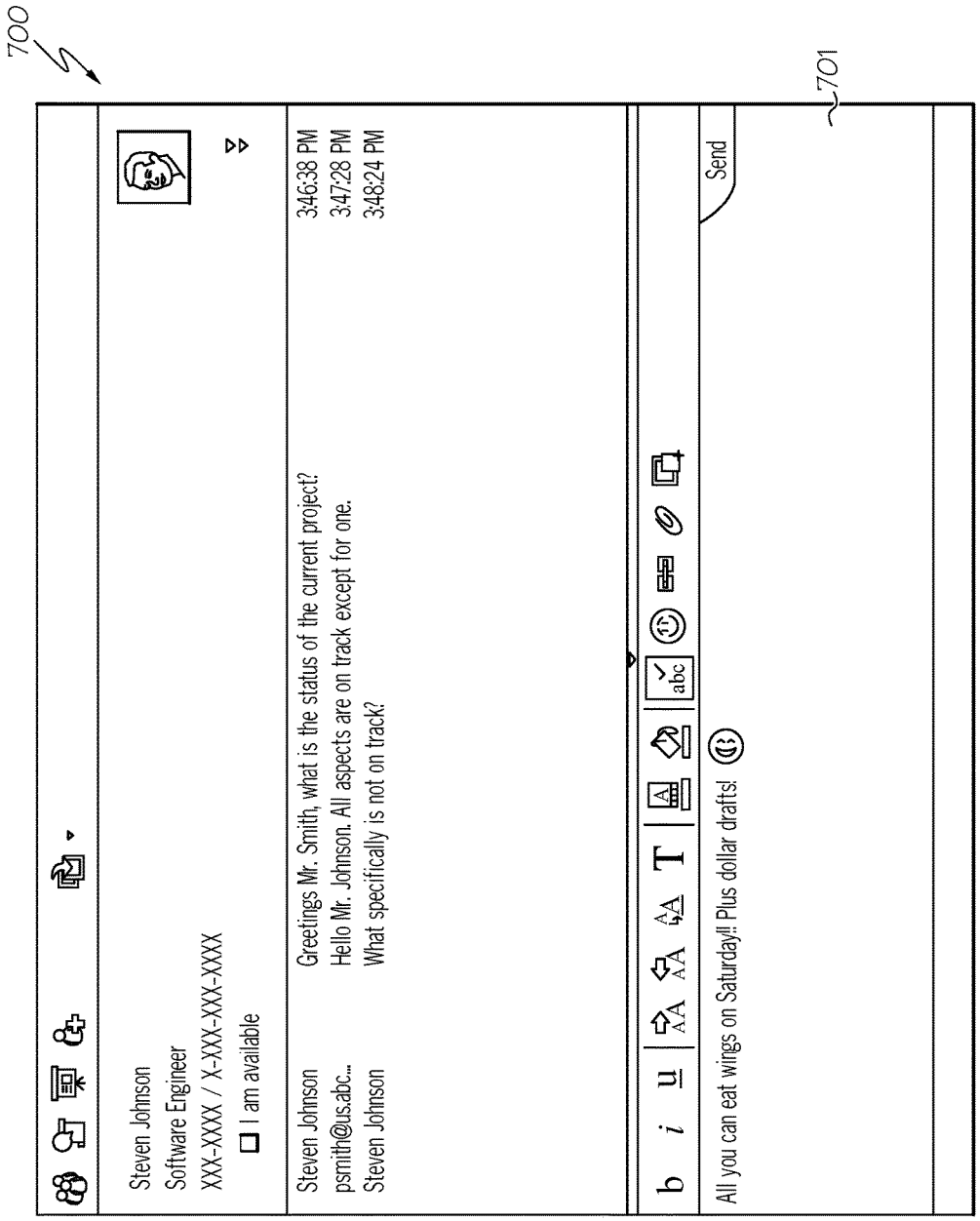
FIG. 7 illustrates a second instant message chat session with Steven Johnson, where the user is actively posting messages in both the first and second instant message chat sessions at the same time in accordance with an embodiment of the present invention.
Figure 8:
FIG. 8 illustrates the user selecting the incorrect recipient to receive a composed e-mail message in accordance with an embodiment of the present invention.

The principles of the present invention provide a means for ensuring that the composed messages are being sent to the intended recipient as discussed below in connection with FIGS. 4-8. FIG. 4 is a flowchart of a method for populating profiles of users, which could be the authors of composed messages and/or the recipients of these composed messages. FIG. 5 is a flowchart of a method for ensuring that a composed message is being sent to the appropriate recipient. FIG. 6 illustrates a first instant message chat session with John Doe. FIG. 7 illustrates a second instant message chat session with Steven Johnson, where the user is actively posting messages in both the first and second instant message chat sessions at the same time. FIG. 8 illustrates the user selecting the incorrect recipient to receive a composed e-mail message.

As stated above, FIG. 4 is a flowchart of a method 400 for populating profiles of users, which could be the authors of composed messages and/or the recipients of these composed messages in accordance with an embodiment of the present invention.

Referring to FIG. 4, in conjunction with FIGS. 1-2, in step 401, monitoring unit 111 monitors the messages (e.g., e-mail messages, instant messages, text messages, social media posts) sent by the users of computing devices 101 across multiple communication channels. For example, monitoring unit 111 monitors the messages posted by the user of computing device 101A on a social media website.

In step 402, monitoring unit 111 extracts the characteristics (e.g., topic affinities for the user, the language pattern of the user, the historical topic discussed by the user, the topic discussed in the current conversation thread, the conversation pattern of the user) of these monitored messages to be placed in a profile for that user (i.e., the user that sent those messages). In one embodiment, as discussed above, monitoring unit 111 extracts these characteristics from the monitored messages using natural language processing. Furthermore, as discussed above, in addition to these profiles storing such dynamic information, such profiles may also store static information (e.g., name, language, location, gender, age, ethnicity, social group, expertise, interest) about the user. In one embodiment, the static information may be provided by the user. In another embodiment, monitoring unit 111 may obtain the static information about the user from social media sources. For instance, the user may indicate such information (e.g., name, language, location, gender, age, ethnicity, social group, expertise, interest, etc.) on the user's social media homepage.

After populating profiles of users containing static and dynamic information described above, such information may be used to ensure that a composed message is being sent to an appropriate recipient as discussed below in connection with FIG. 5.

FIG. 5 is a flowchart of a method 500 for ensuring that a composed message is being sent to the appropriate recipient in accordance with an embodiment of the present invention.

Referring to FIG. 5, in conjunction with FIGS. 1-4, in step 501, analysis engine 108 detects a message (e.g., instant message, e-mail message, text message, social media post) being composed by an author (e.g., user of computing device 101). For example, analysis engine 108 detects an e-mail message being composed by the user of computing device 101 by detecting the user entering words in the body of the e-mail message. In another example, analysis engine 108 detects an instant message being composed by the user of computing device 101 by detecting the user entering words in the instant message chat session window. In a further example, analysis engine 108 detects a social media message being composed by the user of computing device 101 by detecting the user entering words in the social networking feed.

In step 502, analysis engine 108 identifies a recipient(s) to receive the composed message. For example, the user of computing device 101A may create a message to be sent to the users of computing devices 101B, 101C. Analysis engine 108 would then identify those users as the intended recipients to receive the message. For instance, analysis engine 108 may identify those users as the intended recipients to receive the message based on the user entering those users in the "TO:" field.

In step 503, analysis engine 108 analyzes the composed message to identify one or more of the following characteristics: a topic, a greeting, a dialect, a conversation pattern and a language pattern. A "topic" refers to the main subject of the message. In one embodiment, the topic of the composed message may be identified by identifying keywords (e.g., "travel," "meeting," "birthday party") in the message using natural language processing. A "greeting" refers to the salutation or expression of good wishes (e.g., "Hi Joe!"). In one embodiment, a greeting in the composed message may be identified based on identifying keywords (e.g., "Hi") in the message using natural language processing. A "dialect" refers to the form of a language that is spoken in a particular area and that uses some of its own words, grammar, and pronunciations. For example, an individual from one part of the United States may use the term "pop" to reference soda; whereas, an individual from another part of the United States may use the term "coke" to reference soda. A "dialect" in the composed message may be identified based on identifying certain words (e.g., "pop") used by the user in the message using natural language processing. A "conversation pattern" refers to the conversation tone of the message, use of abbreviations by the author in the message, the formality of the words utilized by the author in the message and the use of emotion words by the author in the message. In one embodiment, the conversation pattern is identified in the composed message using natural language processing. A "language pattern" refers to the pattern of language utilized by the author for certain recipients. For example, the author with a Chinese ethnicity may use a Chinese greeting for recipients who also have a Chinese ethnicity. In one embodiment, the language pattern is identified in the composed message using natural language processing.

In step 504, analysis engine 108 obtains the profile for the identified recipient storing information regarding the characteristics of the recipient. For example, as discussed above, the profile stores both static information (e.g., name, language, location, gender, age, ethnicity, social group, expertise, interest) as well as dynamic information (e.g., topic affinities, language pattern, historical topics discussed, topic discussed in current conversation thread, conversation pattern). The static and dynamic information stored in the profile are used to determine the characteristics of the recipient. If more than one recipient is identified in step 502 to receive the composed message, then analysis engine 108 obtains the profiles for the other recipients and performs the same analysis for each of the recipients as discussed herein.

Optionally, in step 505, analysis engine 108 obtains the profile of the author of the composed message (e.g., user of computing device 101A) storing information regarding the characteristics of the author. For example, as discussed above, such a profile stores both the static information (e.g., name, language, location, gender, age, ethnicity, social group, expertise, interest) as well as the dynamic information (e.g., topic affinities, language pattern, historical topics discussed, topics discussed in current conversation threads with particular users, conversation pattern) that are used to identify the characteristics of the author.

In step 506, analysis engine 108 generates a score based on the consistency between the characteristics of the analyzed message with the characteristics of the recipient obtained from the recipient's profile and/or the characteristics of the author obtained from the author's profile. For example, if the topic of the composed message is directed to playing baseball, but the topic discussed in the current conversation thread with the recipient is directed to the meeting tomorrow morning, then analysis engine 108 may generate a low score as such characteristics (characteristic of the composed message having a topic directed to playing baseball and the characteristic of the recipient having a topic directed to a meeting tomorrow morning in the current conversation thread) seem to be inconsistent. In another example, if the author is using the pronoun of "Mr." in the greeting of the composed message, but the recipient is a female, then analysis engine 108 may generate a low score as such characteristics seem to be inconsistent. The greater the consistency between the characteristics of the analyzed message with the characteristics of the recipient obtained from the recipient's profile and/or the characteristics of the author obtained from the author's profile, the greater the score.

In step 507, a determination is made by analysis engine 108 as to whether the score is less than a threshold value.

If the score is less than a threshold value, then, in step 508, analysis engine 108 issues a notification to the author to ensure that the indicated recipient is the correct recipient to receive the composed message. In this manner, such a notification may prevent the author from sending a message to an unintended person thereby preventing a potentially embarrassing situation. For example, analysis engine 108 may issue a warning notification indicating that the indicated recipient may not be the appropriate recipient and to make sure that the author does indeed want to send this message to the indicated recipient as discussed below in connection with FIGS. 6-8.

FIG. 6 illustrates a first instant message chat session 600 with John Doe in accordance with an embodiment of the present invention. FIG. 7 illustrates a second instant message chat session 700 with Steven Johnson, where the user is actively posting messages in both the first and second instant message chat sessions 600, 700 at the same time, in accordance with an embodiment of the present invention.

Referring to FIGS. 6 and 7, the author is currently posting messages in the instant message chat sessions 600, 700 shown in FIGS. 6 and 7. As illustrated in FIG. 6, the author (Peter Smith) is discussing about meeting John Doe at a sports bar. As illustrated in FIG. 7, the author (Peter Smith) is discussing the status of the current project with his boss, Steven Johnson. As shown in FIG. 7, the author (Peter Smith) is responding to the statement made by John Doe regarding wings in instant message chat session 600 ("All u can eat wings on Saturday!! Plus dollar drafts!") in the instant message chat session window 701. Analysis engine 108 detects the conversational tone of the message in the instant message chat session window 701 which is casual (identifies the term "u" being used for "you" using natural language processing). Furthermore, analysis engine 108 detects that the topic of the message in the instant message chat session window 701 is regarding wings using natural language processing. Additionally, analysis engine 108 obtains the characteristics of the recipient (Steven Johnson) from the recipient's profile that includes information, such as the topic currently being discussed in the current conversation thread (status of the current project). Furthermore, analysis engine 108 may obtain the characteristics of the author (Peter Smith) from the author's profile that includes information, such as the conversation tone typically used in conversations with Steven Johnson (e.g., a formal conversation tone is typically used since Steven Johnson is Peter Smith's boss). The casual tone and topic of the composed message in the instant message chat session window 701 is not consistent with the topic currently being discussed in the current conversation thread with Steven Johnson (status of the current project) and neither is the conversation tone appropriate for a conversation with a boss. As a result, analysis engine 108 may generate a low score due to the inconsistency between the characteristics of the analyzed message with the characteristics of the recipient and author obtained from the recipient's and author's profiles. Analysis engine 108 may then issue a warning notification to Peter Smith indicating that the indicated recipient (Steven Johnson) may not be the appropriate recipient and to make sure that the author (Peter Smith) does indeed want to send this message (message shown in window 701) to the indicated recipient (Steven Johnson). In this manner, such a notification may prevent Peter from sending this message to the unintended person thereby preventing a potentially embarrassing situation.

Another example of the principles of the present invention preventing a potentially embarrassing situation is discussed below in connection with FIG. 8.

FIG. 8 illustrates the user selecting the incorrect recipient to receive a composed e-mail message in accordance with an embodiment of the present invention.

Referring to FIG. 8, FIG. 8 illustrates the author (Peter Smith) composing an e-mail message 801 in an e-mail application 800. The author (Peter Smith) selects the recipient identified as Hermanth Kumar8/ABC (hemanth_sr@abc.com) to receive the composed message. Analysis engine 108 analyzes the composed e-mail message 801 to identify the characteristics of the message, such as the topic, which is directed to the topic of Chef Watson. Furthermore, analysis engine 108 obtains the profile of the indicated recipient (Hermanth Kumar8) to identify the characteristics of the intended recipient, such as having no prior history of discussion of the topic of Chef Watson with any other user. As a result, analysis engine 108 may generate a score that is below a threshold value thereby issuing a notification 802 indicating that Hermanth Kumar8 may not be the correct person to contact about the topic of Chef Watson and to make sure that the author (Peter Smith) does indeed want to send this message to Hermanth Kumar8. In this manner, such a notification may prevent Peter from sending this message to the unintended person thereby preventing a potentially embarrassing situation.

Returning to FIG. 5, in conjunction with FIGS. 1-4 and 6-8, if the score generated in step 506 is not less than the threshold value, then, in step 509, analysis engine 108 allows the message to be sent to the indicated recipient without issuing a notification (e.g., warning) to confirm that the author really wants to send this message to the indicated recipient.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for ensuring that a composed message is being sent to an appropriate recipient, the method comprising:
   detecting a message being composed by an author using a computing device;
   identifying a recipient to receive said composed message in response to detecting said message being composed by said author;
   analyzing said composed message to identify the following characteristics of said composed message: a topic, a greeting, a dialect, a conversation pattern and a language pattern, wherein said conversation pattern comprises one or more of the following: a conversation tone, use of abbreviations, formality of words and use of emotion words, wherein said language pattern refers to a pattern of language utilized by said author for certain recipients;
   obtaining five or more of the following characteristics of said recipient from a first profile: a name, a language, a location, a gender, an age, an ethnicity, a social group, an expertise, interests, topic affinities for particular users, a language pattern, historical topics discussed, topic discussed in current conversation thread and a conversation pattern;
   obtaining characteristics of said author from a second profile;
   generating, by a processor, a score based on a consistency between said characteristics of said composed message with said characteristics of said recipient obtained from said first profile and said characteristics of said author obtained from said second profile; and
   issuing a warning notification to said author to ensure that said recipient is a correct recipient to receive said composed message in response to said score being less than a threshold value.

2. The method as recited in claim 1 further comprising:
   permitting said composed message to be sent to said recipient without issuing said warning notification to said author in response to said score not being less than said threshold value.

3. The method as recited in claim 1, wherein said message is detected as being composed by said author by detecting said author entering words in one of the following: a body of an e-mail message, an instant message chat session window and a social networking feed.

4. The method as recited in claim 1, wherein said characteristics of said composed message are identified using natural language processing.

5. The method as recited in claim 1, wherein said first profile is populated with said characteristics of said recipient by monitoring messages composed by said recipient across multiple communication channels and extracting characteristics of said monitored messages comprising one or more of the following: said topic affinities for particular users, said language pattern, said historical topics discussed, said topic discussed in current conversation thread and said conversation pattern.

6. The method as recited in claim 5, wherein said characteristics of said monitored messages are extracted using natural language processing.

7. A computer program product for ensuring that a composed message is being sent to an appropriate recipient, the computer program product comprising a computer readable storage medium having program code embodied therewith, the program code comprising the programming instructions for:
   detecting a message being composed by an author using a computing device;
   identifying a recipient to receive said composed message in response to detecting said message being composed by said author;
   analyzing said composed message to identify the following characteristics of said composed message: a topic, a greeting, a dialect, a conversation pattern and a language pattern, wherein said conversation pattern comprises one or more of the following: a conversation tone, use of abbreviations, formality of words and use of emotion words, wherein said language pattern refers to a pattern of language utilized by said author for certain recipients;
   obtaining five or more of the following characteristics of said recipient from a first profile: a name, a language, a location, a gender, an age, an ethnicity, a social group, an expertise, interests, topic affinities for particular users, a language pattern, historical topics discussed, topic discussed in current conversation thread and a conversation pattern;
   obtaining characteristics of said author from a second profile;
   generating a score based on a consistency between said characteristics of said composed message with said characteristics of said recipient obtained from said first profile and said characteristics of said author obtained from said second profile; and
   issuing a warning notification to said author to ensure that said recipient is a correct recipient to receive said composed message in response to said score being less than a threshold value.

8. The computer program product as recited in claim 7, wherein the program code further comprises the programming instructions for:
   permitting said composed message to be sent to said recipient without issuing said warning notification to said author in response to said score not being less than said threshold value.

9. The computer program product as recited in claim 7, wherein said message is detected as being composed by said author by detecting said author entering words in one of the following: a body of an e-mail message, an instant message chat session window and a social networking feed.

10. The computer program product as recited in claim 7, wherein said characteristics of said composed message are identified using natural language processing.

11. The computer program product as recited in claim 7, wherein said first profile is populated with said characteristics of said recipient by monitoring messages composed by said recipient across multiple communication channels and extracting characteristics of said monitored messages comprising one or more of the following: said topic affinities for particular users, said language pattern, said historical topics discussed, said topic discussed in current conversation thread and said conversation pattern.

12. The computer program product as recited in claim 11, wherein said characteristics of said monitored messages are extracted using natural language processing.

13. A system, comprising:
  a memory unit for storing a computer program for ensuring that a composed message is being sent to an appropriate recipient; and
  a processor coupled to the memory unit, wherein the processor is configured to execute the program instructions of the computer program comprising:
    detecting a message being composed by an author using a computing device;
    identifying a recipient to receive said composed message in response to detecting said message being composed by said author;
    analyzing said composed message to identify the following characteristics of said composed message: a topic, a greeting, a dialect, a conversation pattern and a language pattern, wherein said conversation pattern comprises one or more of the following: a conversation tone, use of abbreviations, formality of words and use of emotion words, wherein said language pattern refers to a pattern of language utilized by said author for certain recipients;
    obtaining five or more of the following characteristics of said recipient from a first profile: a name, a language, a location, a gender, an age, an ethnicity, a social group, an expertise, interests, topic affinities for particular users, a language pattern, historical topics discussed, topic discussed in current conversation thread and a conversation pattern;
    obtaining characteristics of said author from a second profile;
    generating a score based on a consistency between said characteristics of said composed message with said characteristics of said recipient obtained from said first profile and said characteristics of said author obtained from said second profile; and
    issuing a warning notification to said author to ensure that said recipient is a correct recipient to receive said composed message in response to said score being less than a threshold value.

14. The system as recited in claim 13, wherein the program instructions of the computer program further comprise:
    permitting said composed message to be sent to said recipient without issuing said warning notification to said author in response to said score not being less than said threshold value.

15. The system as recited in claim 13, wherein said first profile is populated with said characteristics of said recipient by monitoring messages composed by said recipient across multiple communication channels and extracting characteristics of said monitored messages comprising one or more of the following: said topic affinities for particular users, said language pattern, said historical topics discussed, said topic discussed in current conversation thread and said conversation pattern.

16. The system as recited in claim 13, wherein said message is detected as being composed by said author by detecting said author entering words in one of the following: a body of an e-mail message, an instant message chat session window and a social networking feed.

17. The system as recited in claim 13, wherein said characteristics of said composed message are identified using natural language processing.

* * * * *